United States Patent
Houston

[11] Patent Number: 5,145,498
[45] Date of Patent: Sep. 8, 1992

[54] SMOKE STACK EXHAUST SYSTEM

[76] Inventor: Clarence H. Houston, 92 Barrie Rd. South, Box 38, Orillia, Ontario, Canada, L3V 2T9

[21] Appl. No.: 755,181

[22] Filed: Sep. 5, 1991

[30] Foreign Application Priority Data

Oct. 3, 1990 [CA] Canada ................................. 2026833

[51] Int. Cl.⁵ ............................................ B01D 47/00
[52] U.S. Cl. ........................................ 55/222; 55/228; 55/242; 55/309; 261/DIG. 9
[58] Field of Search ................. 55/222, 228, 242, 312, 55/314, 309; 261/DIG. 9

[56] References Cited

U.S. PATENT DOCUMENTS 3,471,138 10/1969 Lohner ......................... 261/DIG. 9
3,797,204 3/1974 Cavatassi ............................. 55/228
3,993,448 11/1976 Lowery ......................... 261/DIG. 9

FOREIGN PATENT DOCUMENTS 1474866 5/1977 United Kingdom .................. 55/228

Primary Examiner—Bernard Nozick

[57] ABSTRACT

A water-spray gas-scrubbing device of water-cooled metallic construction for use with a processing facility producing gases containing extractable particulate waste and having a conduit for the gases, and a gas-scrubbing chamber in which the combustion gases are washed with water sprays to remove particulate material. The washed gases are vented to the atmosphere and the scrubbing water passes downwardly through a series of metallic mesh filter trays in a filter tower to remove particulate material from that water which is then re-circulated to the scrubbing chamber. The conduit and the combustion chamber are formed as hollow metallic wall structures with inner and outer metallic walls, and cooling water flows continuously through those hollow wall structures to reduce thermal damage thereto.

8 Claims, 3 Drawing Sheets

SMOKE STACK EXHAUST SYSTEM

FIELD OF THE INVENTION

The present invention relates to gas-scrubbing devices of metallic construction.

BACKGROUND OF THE INVENTION

With the growing social concern about the emission of ever-increasing amounts of industrial gases, the need for effective gas-scrubbing devices has increased correspondingly.

Many types of gas-scrubbing devices are already known but such devices are extremely expensive and have limited useful operating lives particularly when they are operated at the high temperatures required for the destruction, deactivation or extraction of toxic waste materials. For example, gas-scrubbing devices constructed of fire-brick or other refractory material are eventually thermally degraded to such an extent that they must be rebuilt, simple repair eventually becoming impossible. Clearly, such reconstruction is extremely expensive and, during such reconstruction, waste gases are vented untreated presenting additional problems.

Gas scrubbers for the removal of particulate waste material usually take the form of cyclone chambers, in which the gases are whirled around at high speed in a conical chamber. The particulate matter is thus separated from the gaseous waste, and falls to the bottom of the chamber.

Gas scrubbers for waste gases containing vaporized contaminants such as organic solvent vapors, usually take the form of incinerators or after-burners designed to raise the temperature of the gases sufficiently to cause oxidation of the vapor. Both forms of gas scrubbers have severe limitations, such as are well recognized in the industry.

In particular, the operation of cyclone-type scrubbers is not suitable for high temperature gases, since they cause rapid destruction of the metallic cyclone chambers, unless the same are made of special high temperature resistant materials, at greatly increased cost. The incineration of gases containing entrained vapors such as organic solvents, while not being generally within the scope of the invention, also presents similar problems of handling high temperature gases. In particular the gases when they exit the incinerator chamber in which the vapors are oxidized, may be in the region of 2,500° F., which presents significant problems in the design and construction of the ducts and chimneys handling these gases.

It is accordingly an object of this invention to provide a gas-scrubbing device of lower cost metallic construction for the aforesaid purposes and which device has a longer useful operating device than those previously known.

It is a further object of this invention to provide a gas-scrubbing device of metallic construction and in which the thermal degradation of structural parts thereof is significantly reduced.

Yet another object of this invention is to provide a gas-scrubbing device of metallic construction and in which the replacement of structural components thereof when eventually required is facilitated thereby delaying the need for total or at least extensive reconstruction of the device.

A further object of the invention is to provide an gas-scrubbing device of metallic construction and which is constructed in such a manner that the replacement of structural parts can be effected much more quickly and at a much lower cost than with gas-scrubbing devices heretofore known.

Other objects of the invention and the advantages presented thereby will become apparent as the description herein proceeds.

SUMMARY OF THE INVENTION

Broadly, the present invention provides a water-spray gas-scrubbing device of water-cooled metallic construction and which comprises a gas conduit means adapted to be connected to a source of gases, said conduit means being formed by mutually spaced apart inner and outer metallic wall members, a gas-scrubbing chamber connected to said gas conduit means for receiving gases therefrom, water spray means in said gas-scrubbing chamber for discharging water through said gases passing through said gas-scrubbing chamber, scrubbing water supply means associated with said water spray means for supplying gas-scrubbing water thereto; filter tower means connected to said gas-scrubbing chamber for receiving both scrubbed gases and scrubbing water from said gas-scrubbing chamber at an upper end of said filter tower means, gas discharge means at an elevated position in said filter tower means for the discharge of scrubbed gases from said filter tower means, filter means in said filter tower means for filtering scrubbing water falling downwardly therethrough, scrubbing water discharge means in said filter tower means for the discharge of filtered scrubbing water therefrom, re-circulating means connecting said scrubbing water discharge means in said filter tower means to said scrubbing water supply means for transporting filtered scrubbing water to said water spray means, flushing means associated with said filter means for discharging water to said filter means to dislodge particulate material therefrom, and waste water discharge means in said filter tower for discharging waste water therefrom.

In accordance with a preferred feature of this invention, the inner and outer wall members of said waste gas conduit means of such a gas-scrubbing device are all formed from a sheet metal material.

The gas-scrubbing chamber of a gas-scrubbing device in accordance with this invention preferably has a structure sloping downwardly toward the filter tower means whereby the scrubbing water flows gravitationally to the filter tower means.

Such gas-scrubbing chamber is preferably of metallic construction and is defined by metallic wall structures each being formed by mutually spaced apart inner and outer metallic wall members, a metallic roof structure formed by mutually spaced apart upper and lower metallic roof members and a base structure is preferably formed by mutually spaced apart upper and lower metallic base members, the spaces between the inner and outer wall members, the upper and lower roof members and the upper and lower base members of the gas-scrubbing chamber being associated with the cooling water supply means and the cooling water discharge means for the passage of cooling water through those spaces. Preferably, a blower means is provided to drive the waste gases through the gas-scrubbing chamber.

In a gas-scrubbing device in accordance with this invention, the filter means advantageously comprises a plurality of downwardly sloping and vertically spaced apart filter trays disposed so that scrubbing water flows sequentially across and downwardly through those trays falling downwardly from each such filter tray to the next tray therebelow, such filter trays being effective to separate particulate material from the scrubbing water flowing therethrough.

In accordance with a preferred feature of this invention, a gas-scrubbing device also comprises heat exchanger means in the first re-circulating means for cooling water flowing therethrough.

The invention also envisages that the scrubbed gases exiting from the gas scrubber in accordance with the invention, shall then be passed to an incinerator, for incinerating the gases before they are vented to atmosphere, for removing or at least oxidizing of non-particulate and gaseous contaminants which may remain after scrubbing.

The various features of novelty which characterize the invention are pointed out with more particularity in the claims annexed to and forming a part of this disclosure. For a better understanding of the invention, its operating advantages and the specific objects attained by its use, reference should be had to the accompanying drawings and descriptive matter in which there is illustrated and described a preferred embodiment of the invention.

IN THE DRAWINGS

DESCRIPTION OF THE PREFERRED EMBODIMENT

Before describing the invention in detail, it must be understood that the invention here is described in general terms as a gas-scrubbing device suitable for use in combination with various industrial and commercial processes producing gases containing particulate contaminants which it is desirable to remove. Such gases will usually be at a considerably elevated temperature. In the past, such gases were usually vented to atmosphere through a tall chimney, formed of brick or other suitable refractory materials. It is of course, well known that such chimneys merely have the effect of passing such gases upwardly to an elevation where they may be entrained in the prevailing wind, and carried away and dispersed in various locations.

Figure 1:
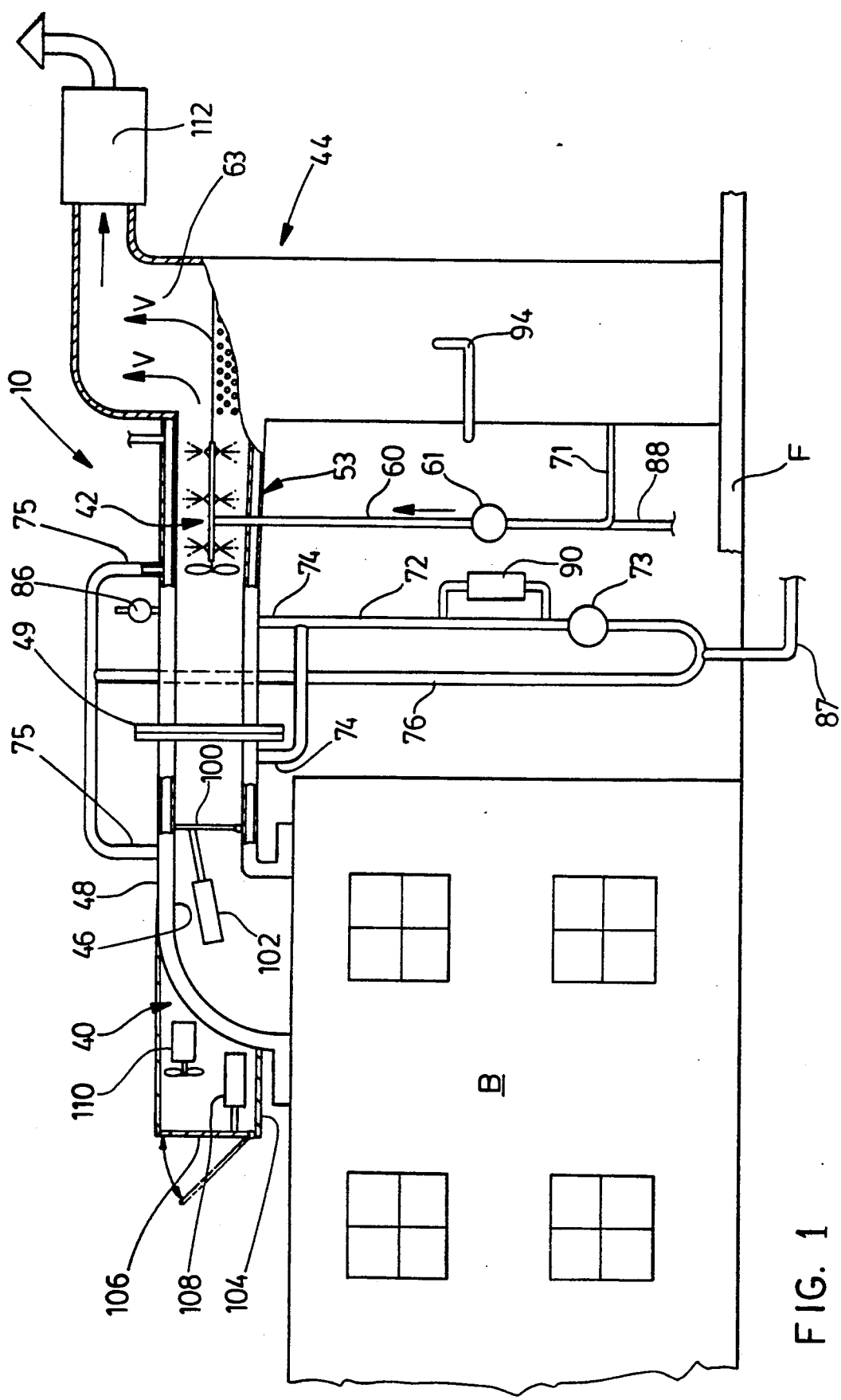
FIG. 1 is a schematic elevational view showing the overall structure of one embodiment of a gas-scrubbing device in accordance with this invention with several component parts omitted for the sake of clarity.

As explained above, the general objective of the invention is to treat these gases and remove the entrained particulate matter from the gases before they are vented to atmosphere. Incidentally, the removal of the particulate materials will also substantially reduce the temperature of the remaining scrubbed gases. The gases may be vented to atmosphere through some form of chimney, (not shown) or may be recycled through an incinerator for removal of gaseous contaminants, which cannot be removed by water scrubbing. The details of such gaseous incinerators are well known in the art and are therefore omitted for the sake of clarity. Referring now to FIG. 1, the source of these gases, is illustrated in the form of a building indicated generally as B. From the building B, gases are removed through a gas transfer conduit means indicated generally as 40, and transferred to a gas-scrubbing chamber 42, after which they are passed to a tower 44, to be described below.

Transfer conduit means 40 is formed of sheet metal construction, and comprises inner wall 46 and outer wall 48, defining in this embodiment a generally cylindrical configuration, although other configurations may also be used. The inner and outer walls 46 and 48 may be provided in sections, and may be joined as at joints 49, for simplicity of construction.

Figure 2:
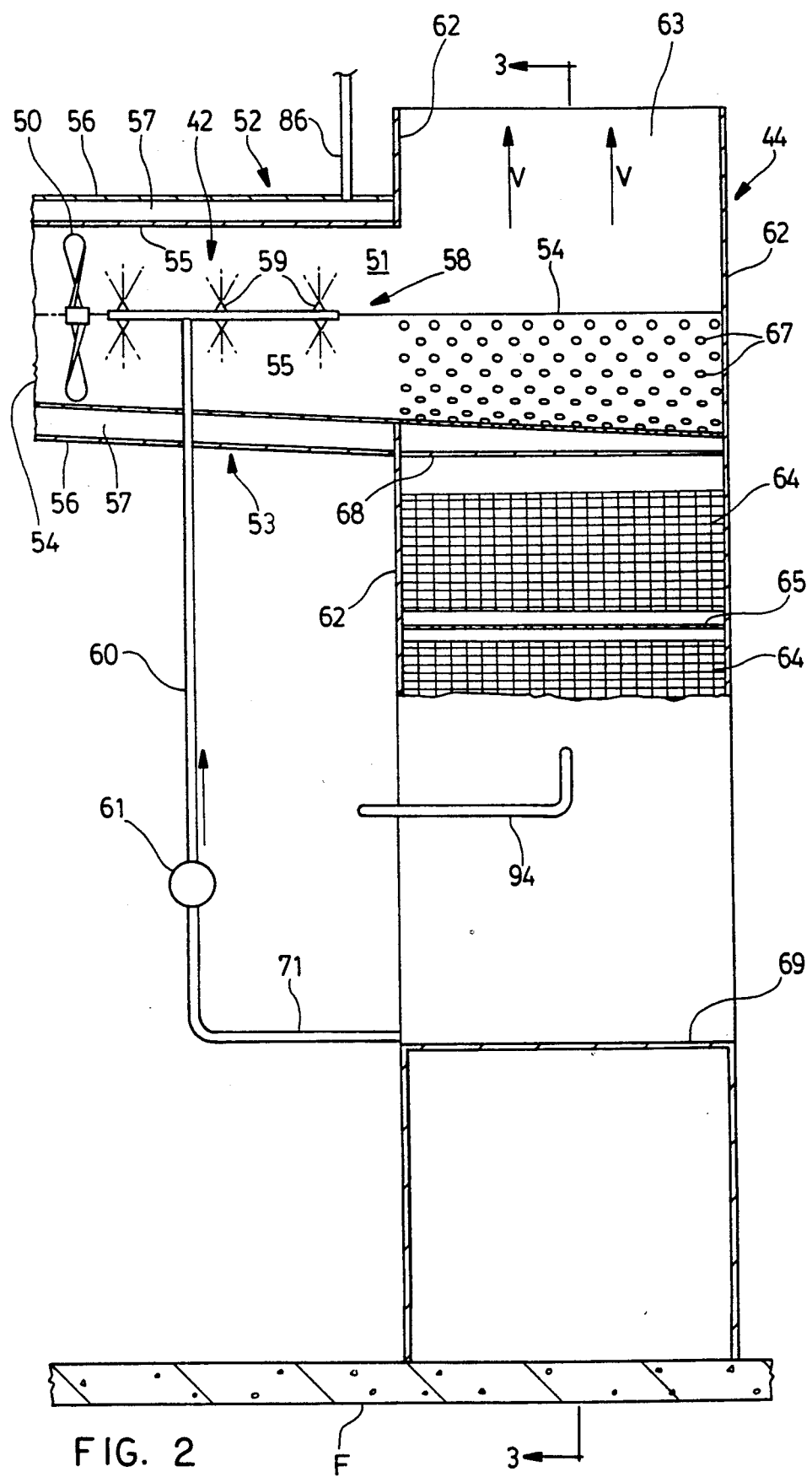
FIG. 2 is a partial vertical sectional view through the gas-scrubbing device of FIG. 1.
Figure 3:
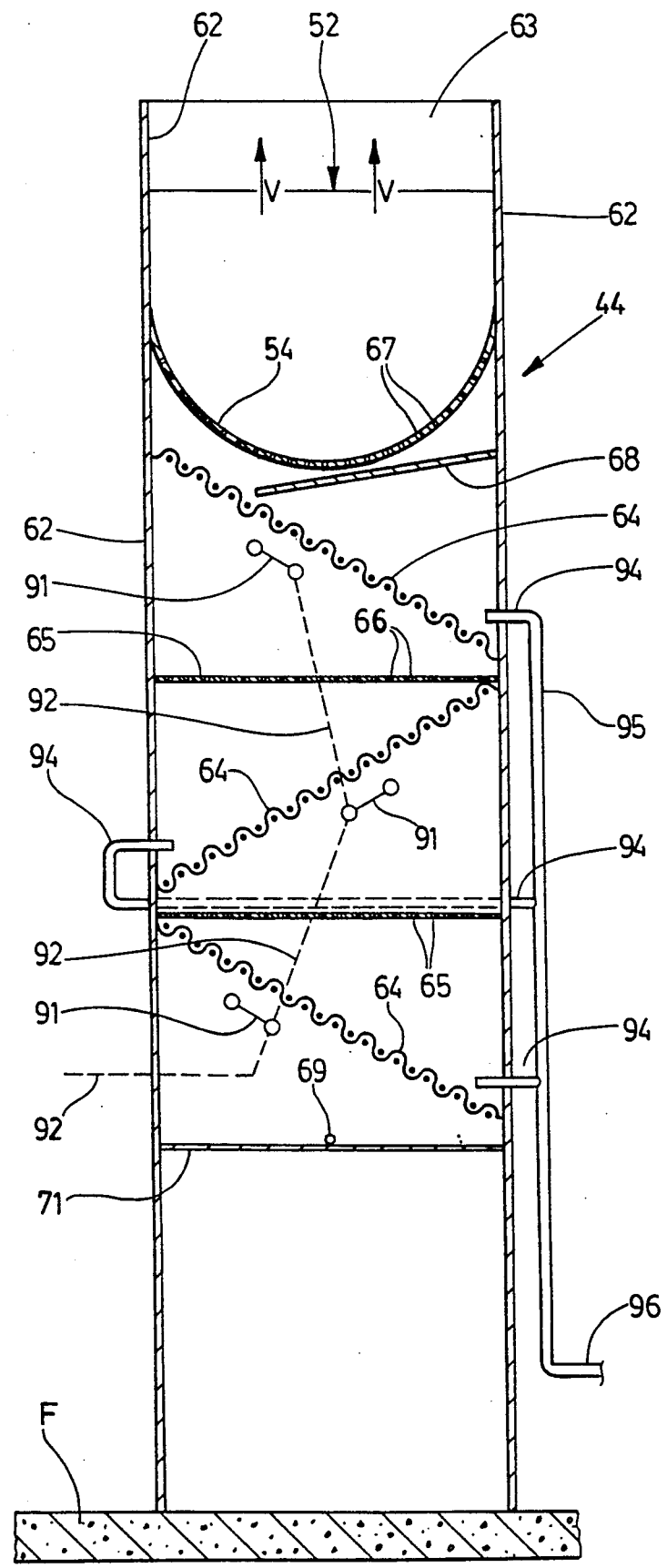
FIG. 3 is a vertical sectional view when taken as indicated by the arrows 3—3 of FIG. 2.

From the transfer conduit means 40, the gases pass directly into the scrubbing chamber 42 (FIGS. 2 and 3). Preferably, a fan means indicated as 50 is provided to drive the waste gases through the scrubbing chamber 42. It will be understood that suitable drive means (not shown) will be provided for the fan 50. The scrubbing chamber 42 is defined by front and rear wall structures generally indicated at 51, a roof structure generally indicated at 52 and a base structure generally indicated at 53. Upwardly, of the base structure 53, there is provided a generally semi-cylindrical collector tray 54 for a purpose yet to be explained. The structures 51, 52 and 53 are preferably also formed of mutually spaced apart inner and outer members 55 and 56 respectively to define therebetween spaces indicated at 57.

Within the gas-scrubbing chamber 42, there is provided a water spray means schematically indicated at 58 and provided with nozzles 59 for discharging or spraying water through the gases passing through that chamber 42. The spray means 58 is shown as being supplied with water through a supply means or conduit 60 by a pump 61 and in a manner to be described in greater detail as the description herein proceeds.

It will be noted that, in accordance with a preferred feature of this invention, the collector tray 54 in the gas-scrubbing chamber 42 slopes downwardly toward the filter tower 44 to permit the scrubbing water to flow gravitationally to that tower 44.

The collector tray 54 usefully extends into the filter tower 44 and, within that tower is perforated to provide discharge openings 67.

In the particular embodiment shown in the accompanying drawings, the filter tower 44 comprises upstanding walls 62 supported on the footing F. The upper end of the tower 44 is open as indicated at 63 to provide a gas discharge means so that scrubbed combustion gases entering the filter tower 44 from the gas-scrubbing chamber 42 can be vented from that tower as indicated by the arrows V.

Within the filter tower 44, there are provided a series of downwardly sloping and vertically spaced apart filter trays 64 formed of metallic meshing so that scrubbing water entering the tower 44 from the gas-scrubbing chamber 42 flows through the openings 67 in the collector tray 54 and then sequentially across and downwardly through those filter trays 64. If desired, an imperforate deflector plate 68 can be provided immediately below the collector tray 54 to cause the water discharging through the openings 67 to be diverted to the upper end of the uppermost filter tray 64.

Between the filter trays 64, there are provided perforated floors 65 formed with holes 66. The scrubbing water falls from a filter tray 64 and onto the floor 65 immediately therebelow and then flows through the holes 66 therein onto the next lower filter tray 64. It should be noted that the floors 65 do not provide a filtering action since the holes 66 therein are sufficiently large to permit the unrestricted flow of solids and water. The filter trays 64 and the floors 65 are secured to the walls 62 by any appropriate means (not shown).

Near to the base of the filter tower, there is provided an imperforate collector tray 69 having an outlet 70 connected to a discharge conduit 71 for re-circulating scrubbing water to the pump 61, and back to spray 58. In order to supply cooling water for the transfer conduit means 40, and the gas-scrubbing chamber 42, means are provided for circulating cooling water as described below.

For this purpose, there is provided cooling water supply means or conduit 72 which is adapted to provide cooling water to the spaces within the walls 46 and 48, and 55 and 56, of the aforementioned structures. In the particular embodiment illustrated, the supply conduit 72 is shown as being provided with cooling water by a pump 73. In FIG. 1, the supply conduit 72 is shown as being connected to water inlets 74. Such cooling water flows upwardly to the inner and outer wall members 46 and 48 and the wall members 55 and 56 and discharges through a discharge outlets 75 for re-circulation through a return conduit 76 to the pump 73.

While separate cooling water supply conduits, discharge conduits and re-circulating pumps can be provided for the several hollow structures hereinbefore enumerated, the device is shown as being provided with a single re-circulating system.

It will now be understood that, in this particular embodiment, the pump 73 is used to effect circulation of cooling water (not shown) through all the aforementioned hollow structures. As previously indicated, it is also within the scope of this invention to provided separate cooling water systems for such separate hollow structures.

Steam-release valves, one of which is indicated at 86, may be provided, either in such hollow structures, as the wall structure of the transfer conduit means or gas-scrubbing means, or in appropriate ones of the water discharge conduits. A make-up water supply conduit 87 can be connected to the system to replace from a suitable source any water which is lost during operation. Similarly, a make-up supply conduit 88 can be provided in the scrubbing water system.

Depending upon the operating temperature of the device and the spacings between the structural members of the various hollow structures, it may sometimes be necessary to provide heat exchanger means as indicated at 90 to ensure adequate cooling of the various components of the device.

Referring again to the filter tower 44, it will be seen from FIG. 3 that filter trays 64 are provided with flushing means for discharging water to those trays for the purpose of dislodging solid material therefrom. In the particular embodiment, such flushing means comprises rotating spray heads indicated schematically at 91 in FIG. 3 and omitted from FIG. 2. Such spray heads 91 are supplied with water through a supply conduit indicated schematically at 92 and which function to spray water upwardly through the filter trays 64. Discharge conduits 94 are provided for each of the filter trays 64 to receive flushing water containing solid material so dislodged from the filter trays 64 for eventual discharge through a main drain conduit 95 leading to drain 96. A drain outlet 97 will usefully be provided in the discharge conduit 71 to allow discharge of flushing water falling into the collector tray 69.

In order to permit servicing of the gas scrubbing device, provision may be made for closing the conduit 46, and temporarily venting unscrubbed gases directly to atmosphere.

This can be achieved by means of the closure door 100 movably mounted in conduit 46 and operable, for example by cylinder 102, between open and close positions as shown in phantom (FIG. 1).

In order to vent the gases to atmosphere, without scrubbing, during this temporary servicing operation, a branch duct 104 is provided, having an atmospheric vent door 106 swingably mounted thereon and operable by means of a cylinder 108. Any suitable fan means 110 may be provided, for assisting in forcing the unscrubbed gases out through the branch duct 104.

In operation the building B will be generating waste gases from whatever industrial or commercial processes are being carried on. The waste gases will pass into the duct means 40.

From the duct means 40, the waste gases are blown into the chamber 42. Within the scrubbing chamber 42, water is sprayed upwardly through the chamber from spray 58 and impacts on the roof on the chamber, and falls downwardly in continuous streams through the chamber onto the floor of the chamber. From the floor of the chamber, the water then flows outwardly by means of gravity.

The pumps 61 and 73 are operated to provide respectively a gas-scrubbing water spray from the nozzles 59 within the gas-scrubbing chamber 42, and also cooling water circulation through the hollow walls of the duct means 40 and the gas-scrubbing chamber 42 in the manner already described.

The gas-scrubbing water spray is effective to remove the particulate material from those gases. The combustion gases so scrubbed then pass into the filter tower 44 from which they pass, for example as indicated by the arrows V.

The scrubbing water then passes along the collector tray 54 and into the filter tower 44. In that tower, the scrubbing water flows downwardly through the openings 67 in the collector tray 54, downwardly across deflector plate 68, and then downwardly through the filter trays 64 and through the holes 66 in the floors 65, the particulate material in such water being retained on the filter trays 64 The scrubbing water with particulate material removed therefrom eventually reaches the collector tray 69 for discharge through the discharge conduit 71 and re-circulation to the gas-scrubbing chamber 42 by the pump 61.

After an extended period of operation, the duration of which will vary according to the nature of the waste gases being treated, the mesh openings in the filter trays 64 will eventually become plugged with particulate material. At such time, the flushing system is operated to remove such particulate material from those trays. For this purpose, high pressure flushing water is discharged from the water rotating spray heads 91 upwardly through the filter trays 64. Mechanical drive means can be provided for rotating the spray heads 91 or their rotation can be caused automatically by reaction to the water discharge therefrom. Such water with the dislodged particulate material is then collected by the discharge conduits 94 and drained through the main drain conduit 95 and the drain 96. During such flushing operation, flushing water will also flow downwardly through the filter trays 64 and the holes 66 in the floors 65 finally to be collected in the collector tray 69 from which it can be discharged to waste by drain means (not shown).

It will further be understood that, by continuously passing cooling water through the hollow component structures of the duct means 40 and the gas-scrubbing chamber 42, those structures will be maintained at much lower temperatures than is the case with previously known devices. Consequently, such structures will suffer thermal damage or degradation to a much lower extent than with known devices. Furthermore, when such structural components do actually require replacement, after an extended period of use, such replacement does not require complete reconstruction of the entire combustion chamber and gas-scrubbing chamber.

Where the nature of the gas effluents from the plant require it, they may be subject to incineration, at a point downstream of the scrubbing chamber, in a manner known per se, so as to remove or at least oxidize gaseous contaminants, such as volatile solvents and the like, which may not be removed by the scrubbing chamber.

However, this is not illustrated in detail herein, since incinerators are within the scope of the state of the art and requires no further description. Such an incinerator is shown in FIG. I, in schematic form as 112.

The foregoing is a description of a preferred embodiment of the invention which is given here by way of example only. The invention is not to be taken as limited to any of the specific features as described, but comprehends all such variations thereof as come within the scope of the appended claims.

What is claimed is

1. A water-spray gas-scrubbing device of water-cooled metallic construction for use in association with a processing means producing waste gases at an elevated temperature containing particulate matter and comprising:
   gas conduit means adapted to be connected to said processing means for carrying gases therefrom at an elevated temperature, said conduit means comprising inner walls and outer walls spaced apart from one another and defining a conduit cooling jacket;
   water circulation means for circulating cooling water through said conduit cooling jacket;
   a gas-scrubbing chamber connected to said conduit means for receiving waste gases therefrom, said gas-scrubbing chamber in turn comprising inner and outer walls spaced apart from one another and defining a chamber cooling jacket and defining a roof portion, side walls and a floor portion, said floor portion at least being arranged at an angle relative to the horizontal, with a higher portion at an upstream end of said gas-scrubbing chamber adjacent to said gas conduit means, and a lower portion at a downstream end of said gas-scrubbing chamber;
   water circulation means adapted to circulate water through said gas-scrubbing chamber cooling jacket;
   water spray means in said gas-scrubbing chamber for spraying water through said gases passing through said gas-scrubbing chamber;
   scrubbing water supply means associated with said water spray means for supplying gas-scrubbing water thereto;
   filter tower means connected to said downstream end of said gas-scrubbing chamber for receiving both scrubbed gases and scrubbing water from said gas-scrubbing chamber at an upper end of said filter tower means;
   gas discharge means at an elevated position in said filter tower means for the discharge of scrubbed gases from said filter tower means;
   filter means in said filter tower means for filtering scrubbing water flowing downwardly therethrough;
   scrubbing water discharge means in said filter tower means for the discharge of filtered scrubbing water therefrom;
   re-circulating means connecting said scrubbing water discharge means in said filter tower means to said scrubbing water supply means for transporting filtered scrubbing water to said water spray means;
   flushing means associated with said filter means for discharging water to said filter means to dislodge particulate material therefrom, and,
   waste water discharge means in said filter tower for discharging waste water containing particulate material therefrom.

2. A water spray gas scrubbing device as claimed in claim 1, and further including a branch vent duct means connected to said gas conduit means, means for closing said gas conduit means, and means for opening said branch vent duct means, whereby unscrubbed gases may be vented to atmosphere temporarily, and whereby said gas conduit means may be temporarily closed, during servicing.

3. A water spray gas scrubbing device as claimed in claim 1, and further including gas incineration means connected downstream of said gas scrubbing chamber for receiving waste gases therefrom, and for incinerating same prior to venting to atmosphere.

4. A water-spray gas-scrubbing device as claimed in claim 1 and in which said inner and outer walls of said conduit and said chamber are all formed from a sheet metal material.

5. A water-spray gas scrubbing device as claimed in claim 4 and which additionally comprises blower means for driving said gases through said gas-scrubbing chamber.

6. A water-spray gas-scrubbing device as claimed in claim 1 and in which said filter means comprises a plurality of downwardly sloping and vertically spaced apart filter trays disposed so that scrubbing water flows sequentially across and downwardly through said trays flowing downwardly from each said filter tray to the next said tray therebelow, said filter trays being effective to separate particulate material from said scrubbing water flowing therethrough.

7. A water-spray gas-scrubbing device as claimed in claim 6 and which additionally comprises heat exchanger means in said re-circulating means for cooling water flowing therethrough.

8. A water-spray gas-scrubbing device as claimed in claim 6 and in which said flushing means comprises rotating spray means adapted to discharge water upwardly through said filter means.

* * * * *